United States Patent [19]

Roth et al.

[11] 4,419,033

[45] Dec. 6, 1983

[54] SYSTEM FOR RELEASABLY SECURING MOVABLE SUPPORT ELEMENTS ON SPACE VEHICLES

[75] Inventors: Martin Roth, Taufkirchen; Helmut Kiendl, Munich, both of Fed. Rep. of Germany

[73] Assignee: Messerschmitt-Bölkow-Blohm Gesellschaft mit beschränkter Haftung, Munich, Fed. Rep. of Germany

[21] Appl. No.: 261,755

[22] Filed: May 8, 1981

[30] Foreign Application Priority Data

May 13, 1980 [DE] Fed. Rep. of Germany ....... 3018245

[51] Int. Cl.³ .......................... B60P 1/64; B60P 7/06; B63B 25/00
[52] U.S. Cl. .................................... 410/32; 244/173; 403/328; 410/2; 410/79; 410/81
[58] Field of Search ............ 244/118.1, 137 R, 137 A, 244/138 R, 173; 403/328; 410/2, 32, 79, 81, 107, 111, 156

[56] References Cited

U.S. PATENT DOCUMENTS

| 2,478,019 | 8/1949 | Sonntag | 244/137 A X |
| 2,489,984 | 11/1949 | Shoemaker | 244/137 A |
| 3,733,758 | 5/1973 | Maier et al. | 244/173 X |
| 4,155,524 | 5/1979 | Marello et al. | 244/173 |
| 4,347,023 | 8/1982 | Rizos | 410/32 |

FOREIGN PATENT DOCUMENTS

| 2021580 | 8/1972 | Fed. Rep. of Germany | 244/173 |
| 2751273 | 7/1979 | Fed. Rep. of Germany | 244/173 |
| 2038923 | 7/1980 | United Kingdom | 244/173 |

Primary Examiner—Robert B. Reeves
Assistant Examiner—Howard Beltran
Attorney, Agent, or Firm—Toren, McGeady and Stanger

[57] ABSTRACT

A system for releasably securing support elements in a space vehicle wherein a holding element extending through the support elements is pivotally mounted to a lever at the inner end thereof with a spring loaded release lever maintaining the outer end of the holding element in securing position. The inner end of the holding element is pivotally mounted to the lever at a point located eccentrically relative to the point of rotation of the lever and a releasable spring loaded piston operates upon severing of a blocking element to release the spring loaded piston to enable the lever to rotate to move the holding element so that the release lever engaging the outer end thereof may operate to release the holding engagement between the release lever and a support bushing whereupon the support elements will be released for movement. A limitation member is provided to limit the angle of movement of the release lever to 90° when releasing the outer end of the holding element.

8 Claims, 2 Drawing Figures

SYSTEM FOR RELEASABLY SECURING MOVABLE SUPPORT ELEMENTS ON SPACE VEHICLES

The present invention relates generally to holding or latching devices particularly suitable for use in space vehicles and more particularly to a system for releasably securing in place support elements which may be folded or swung outwardly when released.

The system of the present invention relates to the type of system known from U.S. Pat. No. 4,347,023, issued Aug. 31, 1982, assigned to the assignee hereof, wherein at least one holding element is guided through support elements of the type to be releasably secured by the present invention. As described therein, during the climbing phase of a space vehicle, devices such as antennae or solar generators on the space vehicle must be first secured in place and be capable of subsequently being folded or swung outwardly into operative position. Such devices must be secured in place so as to avoid oscillation and vibration thereof. After separation of the rocket from the space vehicle, the outward movement of these devices must occur with ease and facility and must not be impaired by the system which is used to secure them in place prior to their movement into operative position. Otherwise, it will be apparent that the mission of the space vehicle or missile would be endangered or subject to failure.

In accordance with U.S. Pat. No. 4,347,023, a holding pin is guided through the support elements which are to be secured in place during the climbing phase of the space vehicle operation and the holding pin is held at a lower end thereof by means of a locking bolt arrangement at the space vehicle so as to rest at its upper end on the top side of the outermost support element. Such a holding pin has, at its lower end, a recess into which a locking bolt engages. The locking bolt is held in the engaged position by a blocking element wherein the blocking element may be rotated to one side after a holding cable has been cut or released. The necessary initial stress in the holding pin is applied by tightening of a nut.

The present invention is directed toward an improvement in this known type of system wherein before the support elements may be moved out, the force of the tension of the securing elements may be released so that the supporting element will be released at the outer support element while avoiding a situation where the high initial tension would affect the release process.

SUMMARY OF THE INVENTION

Briefly, the present invention may be described as a system for releasably securing in place support elements of a space vehicle which are movable when released out of the secured position, the system basically comprising a holding element which extends through the support elements and which is formed with an inner end and an outer end. The holding element is rotatably installed at its lower end at a lever having a center of rotation which lies eccentrically with respect to the center of rotation of the holding element. The lever is pressed in the stretched position with one side to a stop by means of a spring loaded piston, wherein the piston is held by a blocking system in accordance with U.S. Pat. No. 4,347,023 and wherein the holding element rests at its outer end on a spring loaded release lever which is rotatably mounted in a support bushing. The release lever serves as a support in the stretched position, it is rotatable for release through 90° up to a limitation means, and the holding element is arranged to be slidable in an opening of the support bushing.

The special advantage of the securing system in accordance with the present invention resides in the fact that high forces can be absorbed but that nevertheless minor reactions to the blocking system with the holding cable may occur. The number of support elements to be held down may be changed at random because, under such circumstances, it would merely be necessary to adapt the length of the holding element.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENT

Figure 1:
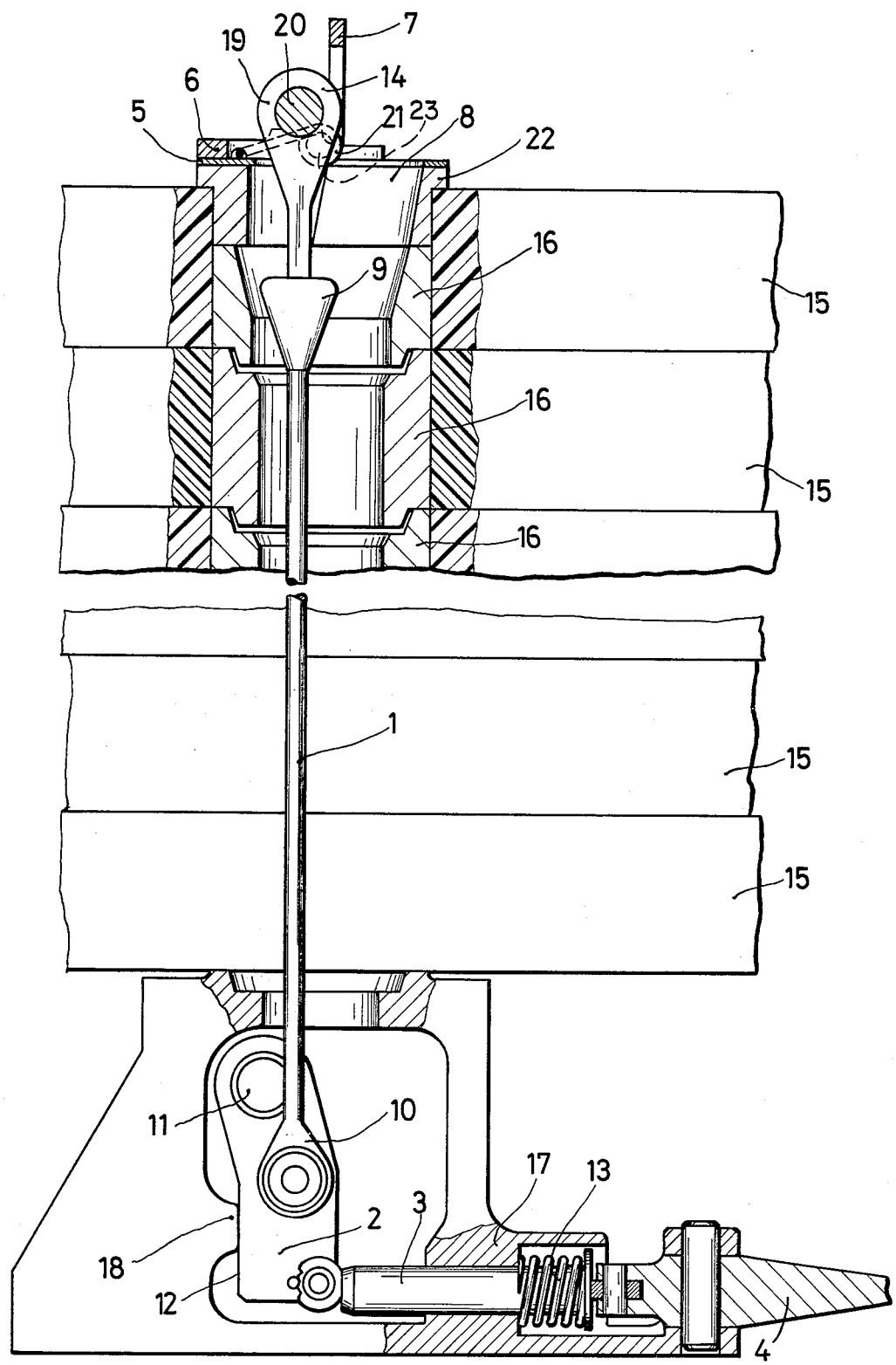
FIG. 1 is a view partially in section showing a releasable securing system in accordance with the invention.
Figure 2:
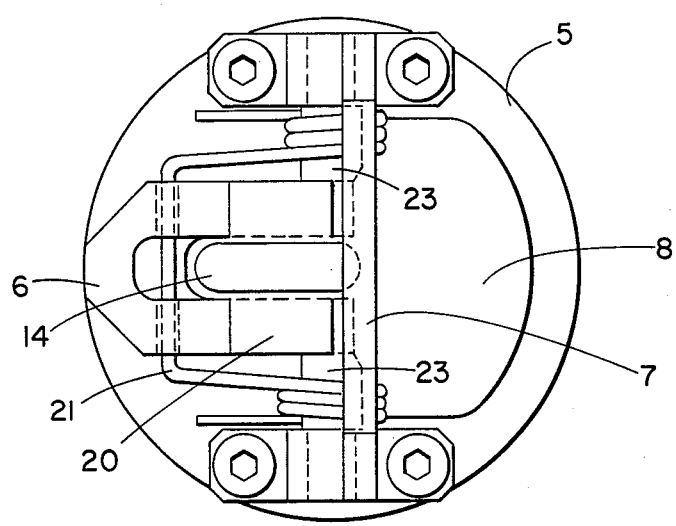
FIG. 2 is a top view of the system of FIG. 1.

As shown in the drawing, the system of the present invention is basically comprised of a holding element 1, which may be formed with a rod-like configuration as described in U.S. Pat. No. 4,347,023 but which, however, is preferably formed as a flexible cable which projects through a plurality of bushings 16 within support elements 15.

The holding element 1 is rotatably installed at its lower or inner end 10 at a lever 2. A pivot 11 defines a center of rotation of the lever 2 which is positioned eccentrically with respect to the point of action of the holding element 1 so that the lever 2 will have a natural tendency to rotate counterclockwise.

In the secured position of the device, the lever 2 rests at a side 12 thereof against a stop 18, with the stop 18 being formed as part of a housing 17 which is rigidly connected with the space missile or vehicle.

The lever 2 is held in place by a piston 3 which maintains the lever 2 against the stop 18. The piston 3 is arranged under the tension of a spring 13 and it is forceably held in this position by means of a blocking element 4.

The blocking element 4 corresponds to a similar element known from U.S. Pat. No. 4,347,023. This relates to a lever which is held in position by a holding cable. When the holding cable is severed, the blocking element is rotated to one side so that the piston 3 may be moved to the right by means of the spring 13.

The upper or outer end 14 of the holding element 1 projects beyond a stack of support elements 15. The holding element 1 rests upon a U-shaped release lever 6 which serves in the position shown in FIG. 1 as a support for the holding element. The support may be effected in that the holding element 1 is formed with an eye 19 through which a pin 20 is guided which in turn rests upon the release lever 6. The release lever 6 is rotatably mounted at 23 in a support bushing 22 under the tension of a spring 21. A stop member or limitation member 7 operates to limit rotation of the release lever 6 to an angle of 90° from the position shown in FIG. 1 to an upright position at which the lever 6 abuts the member 7.

An adjustment plate 5 is formed opposite the release lever 6 with an opening 8 which is large enough that the support elements 15 can slide over the holding element 1.

In the operation of the securing system in accordance with the invention, at a predetermined point in time, the cable holding the blocking element 4 will be severed or cut pyrotechnically via radio or automatically.

The blocking element rotates away from the piston 3 so that the piston may be moved outwardly toward the right under the action of the spring 13 and also due to the resulting initial tension in the holding element 1. The lever 2 will now be free to pivot about the pivot means 11 and it will release the tension in the holding element 1 so that the element 1 can be released at its outer or upper end 14 so that the pin 14 will release the lever 6. The release lever 6 which is under the tension of the spring 21 may now rotate through an angle of 90° until it encounters the limitation member 7. The release lever 6 will now push the holding element 1 so far to the side that the holding element will lie freely in the opening 8 of the support bushing 22.

During this operation, the support elements 15 can be moved freely outwardly. A shield 9 installed at the holding element 1 and the flexibility of the holding element 1 will ensure that all further support elements may slide over the holding element 1 without any impediment.

By changing the length of the holding element 1, the system may be adapted to secure any number of support elements. The necessary initial tension in the holding element 1 can, additionally, be adjusted by means of the adjustment plate 5.

While a specific embodiment of the invention has been shown and described in detail to illustrate the application of the inventive principles, it will be understood that the invention may be embodied otherwise without departing from such principles.

What is claimed is:

1. A system for releasably securing in place support elements of a space vehicle which are movable when released out of said secured position comprising: a holding element extending through said support elements having an inner end and an outer end; a lever means pivotally mounted about an axis and having said inner end of said holding element pivotally mounted thereto eccentrically relative to said axis; stop means limiting movement of said lever means in one direction; spring loaded piston means adapted to engage with said lever means; a blocking element engaging said spring loaded piston means and blocking movement thereof to hold said means against said stop means, said spring loaded piston means operating to release said lever means to enable pivotal movement of said lever means about said axis away from said stop means when released by said blocking element; a spring loaded release lever engaged by said outer end of said holding element and retained by said holding element in a position releasably securing said support elements; a support bushing having said release lever rotatably mounted thereto; and limitation means limiting to 90° the movement of said release lever from a position engaging said outer end of said holding element to a position releasing said outer end; said holding element being adapted to slide through an opening in said support bushing to release said support elements when said release lever moves to release said outer end thereof.

2. A system according to claim 1 wherein said holding element includes a shield which ensures secure sliding movement over said holding element.

3. A system according to claim 1 wherein said holding element is a flexible cable.

4. A system according to claim 1 further including an adjustment plate mounted in cooperative relationship in the vicinity of said outer end of said holding element operating to enable variation of the initial tension in said holding element by the thickness of said adjusting plate which is inserted at the outer side of said support elements.

5. A system for releasably securing in place support elements, particularly for use in space vehicles, comprising:
a longitudinal holding element adapted to extend through openings in said support elements from one side thereof to another, said holding element having an inner end and an outer end;
a holding lever pivotally mounted about a lever axis and having said inner end of said holding element pivotably connected thereto about a pivot axis located eccentrically relative to said lever axis;
release lever means interposed between said support elements and said outer end of said holding element to apply against said support elements a holding force exerted against said release lever means by said holding element when said holding lever is in a pivotal holding position to press said outer end against said release lever;
spring means applying to said release lever a biasing spring force against the holding force of said holding element; and
releasable blocking means operating to apply against said holding lever a blocking force tending to prevent said holding lever from moving away from said pivotal holding position and also operating to release said blocking force to enable said support elements to be released from said holding force applied thereto by said holding lever.

6. A system according to claim 5 wherein said releasable blocking means comprise a stop member and a spring loaded piston acting againt said holding lever to force said holding lever against said stop member thereby to hold said holding lever in said pivotal holding position.

7. A system according to claim 5 further comprising limitation means located relative to said release lever means to restrict pivotal movement thereof under the urging of said spring means to within a 90° angle.

8. A system according to claim 6 wherein said spring loaded piston operates to apply a force against said holding lever to rotate said holding lever about said lever axis in order to move said inner end of said holding element against the force of said spring means to cause said outer end of said holding element to press said release lever means against said spring means.

* * * * *